United States Patent [19]

Hale

[11] Patent Number: 5,078,431
[45] Date of Patent: Jan. 7, 1992

[54] ELECTRICALLY INSULATED PIPELINE JOINT FOR FLUID OR GAS PIPLINES

[75] Inventor: Neville E. Hale, Mississauga, Canada

[73] Assignee: Sealtec Machine, a partnership, Burlington, Canada

[21] Appl. No.: 649,905

[22] Filed: Feb. 1, 1991

[51] Int. Cl.⁵ ............................................. F16L 59/14
[52] U.S. Cl. .......................................... 285/47; 285/54; 285/919
[58] Field of Search ...................... 285/48, 53, 54, 363, 285/374, 405, 919, 49, 50

[56] References Cited

U.S. PATENT DOCUMENTS

| | | | |
|---|---|---|---|
| 393,684 | 11/1888 | Berryhill | 285/374 X |
| 1,491,032 | 4/1924 | Croker | 285/363 X |
| 2,258,135 | 10/1941 | Curtis | 285/374 |
| 2,309,974 | 2/1943 | Miller | 285/374 X |
| 4,314,655 | 2/1982 | Leibhard et al. | 285/50 A |
| 4,790,570 | 12/1988 | DeGruijter | 285/54 |

FOREIGN PATENT DOCUMENTS

| | | | |
|---|---|---|---|
| 24433 | 7/1936 | Australia | 285/50 |
| 958710 | 2/1957 | Fed. Rep. of Germany | 285/374 |
| 494 | 1/1884 | United Kingdom | 285/54 |

Primary Examiner—Dennis L. Taylor
Assistant Examiner—Heather Chun
Attorney, Agent, or Firm—Donald E. Hewson

[57] ABSTRACT

An electrically insulated pipeline joint for use in fluid or gas pipelines is disclosed. Such a joint is used to electrically insulate one section of a pipeline from an adjoining section pipeline. The joint is further designed to preclude physical failure therein and also to preclude leaks from forming therein, in the case of mechanical failure.

7 Claims, 3 Drawing Sheets

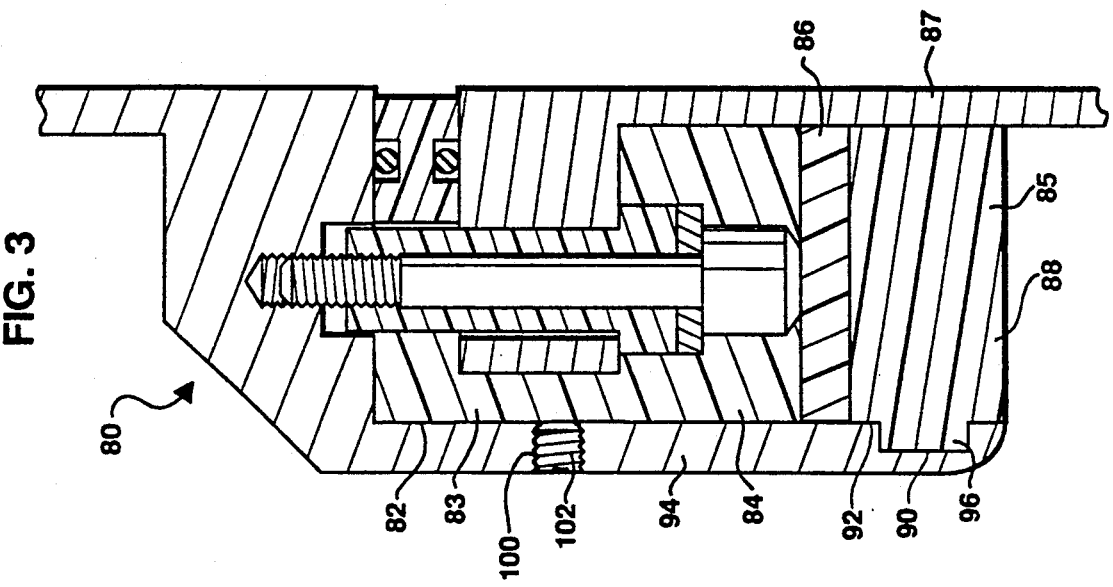
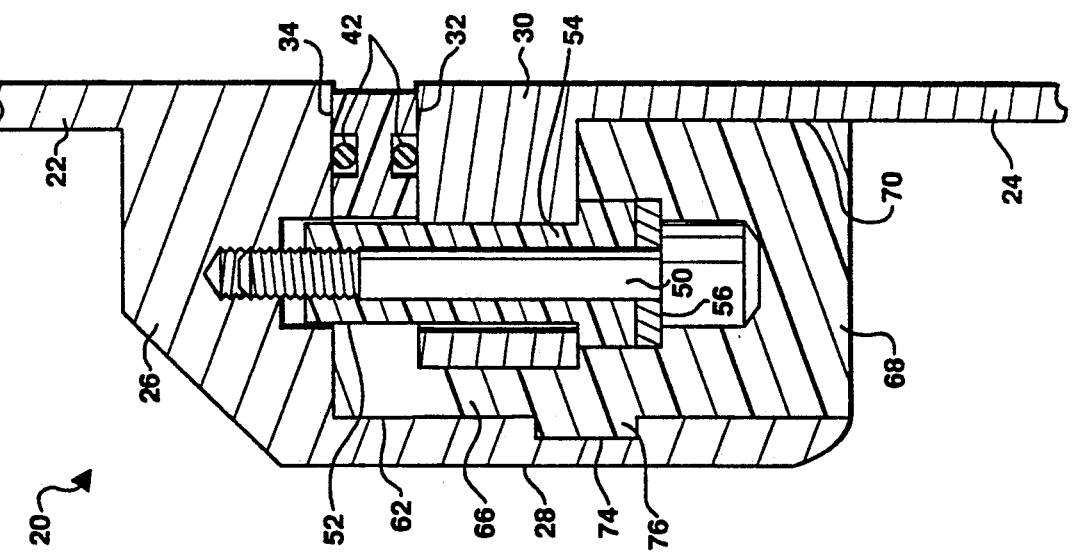

ELECTRICALLY INSULATED PIPELINE JOINT FOR FLUID OR GAS PIPLINES

FIELD OF THE INVENTION

This invention relates to pipelines and more particularly to joints in pipelines, where the joints are meant to be physical separators and electrical insulators between contiguous lengths of pipe. Such pipelines are typically gas pipelines where the gas is highly pressurized. The piping may be under ground or above ground, whether in an urban or non-urban environment.

BACKGROUND OF THE INVENTION

Pipelines are typically used to carry liquids and gas, such as natural gas, oil, and so on, throughout all points in a distribution network that is used to bring these products from their source, such as a natural gas field or oil field, or a refinery, to their place of consumption such as a home or industry. In this distribution network, the pipelines may need to be located in the wilderness, either underground or above ground, most likely over very great distances. Further, these pipes must also form the network in any sort of refinery or other related operation, and also form the network that supplies end users, such as homes and industries, with the contained product. Any network of such piping that is to be found above ground or underground in the outdoors, may be exposed to and need to endure heat, cold, ground movement, lightning, ground electrical potential, water, chemicals, and physical abuse from maintenance, among other things. Any piping network that is in an urban area or is within an industrial setting such as refinery, or similar, must endure most of these problems and also any other rigours that maybe placed on the pipeline, such as being exposed to other utilities such as hydro, and also be extremely safe so as to be acceptable for being used within an inhabited area.

A ground electrical potential may occur in a buried pipe due to induction from nearby hydro wires or high voltage DC wires (such as used in some transit systems). Further, a portion of the pipe may be electrified by being placed in a cathodic protection mode in order to preclude corrosion of the pipe. Such cathodic protection involves purposely introducing a negative electrical potential to the section of the pipe that is to be protected. It is undesirable that the potential be introduced to a longer section of the pipe than necessary.

These pipes must also carry various types of products, at possibly low or very high pressures, or even under changing pressure conditions. They must also be able to carry these products in different volumes and therefore the pipelines must be of various sizes.

In general, these pipelines are installed in sections that are quite lengthy. Smaller sections of perhaps ten feet to fifty feet are welded one to another in order to form a fairly lengthy section that essentially becomes a monolith that is perhaps several hundred yards to hundreds or thousands of miles long. These pipelines are generally made of a steel alloy, and since they are welded together the monolith that is formed is essentially a rigid structure with virtually no physical flexibility to it. Also, since steel is the main component of the pipeline, they are good conductors of electricity. Resultingly, such pipelines inherently have two problems. Firstly, any structure that is buried within the ground or is sitting the ground is susceptible to any movement within the ground. Such ground movement may cause bending moments or torsion within the pipeline. Over a large distance, the pipeline could very easily be exposed to movements large enough to break the pipeline or at least stress the pipe line enough that the highly pressurized gas within it would cause the pipeline to fracture. Secondly, an electrical potential can develop in the pipeline for a number of reasons including lightning, ground electrical potential, stray hydro lines, and so on, thereby electrifying the pipeline. In order to overcome these problems, electrically insulating joints are installed every so often in a pipeline. These joints provide electrical insulation between sections of the pipeline. Further, these joints are designed and constructed to have a higher strength than the pipeline such that in a bending mode the joint will survive when the pipeline breaks.

Moisture presents a problem in terms of conduction of electricity, static or otherwise, to and around pipelines. Electrically insulating joints that are installed in pipelines must not be affected by moisture in that they must remain insulating even when exposed to moisture. Further, such joints must not corrode or generally break down due to moisture.

It is necessary that any pipeline be sectioned off, with the resulting sections being electrically insulated one from the other in order that any electrical potential that may be present in any part of the pipeline not be transmitted very far along the pipeline. This would preclude any electrical potential from migrating very far along the pipeline and thereby creating an electrically unsafe conditions. Such an electrically unsafe condition may potentially cause an explosion or may cause a potentially dangerous condition for someone who may be working on the pipeline, in an industry served by the pipeline, in a refinery, at the source of the product, or in a home.

In its most basic form, a joint comprises two fairly short pieces of pipe, one at each end of the joint and a seal between the two pieces of pipe. In order to properly receive the seal, the two ends of the pipes facing one another each terminate in a flange, the two flanges co-operate with one another and with the seal therebetween in order to form a "leak-proof" joint. Such a joint is welded at each of its two open ends to a pipe, thus joining the two pipes in sealed relation.

Such joints are typically installed into a pipeline as the pipeline itself is constructed. It is also possible, however, to install joints into an already existing pipeline, which may be necessary for a variety of reasons such as, if there is a break in the pipeline, if there is a need for further electrical insulation, and so on. The easiest way to fix a break in the pipeline is to cut the pipeline at the break and to install a joint at that point. Further, it may also be necessary to put additional joints in a section of pipeline if it is found that additional electrical insulators are required.

Some types of joints, whether they are being installed when the pipeline is being installed, or joints are being installed into an already existing pipeline, can be assembled "in the field" as they are installed onto the pipeline. This is not an ideal situation, however, since the weather conditions may make proper assembly and installation of the joint difficult. There is little or no control over quality of the work that is done in terms of assembly of the joint, and there is most likely no way of testing the joint before it must actually function in the pipeline. Further, the joint is most likely going to be built using less that an ideal method, in that it is virtually impossible to use a fully automated method, or at least a precise production line method, as could be used in a factory. Therefore, it is preferable that a joint be constructed in a factory since any preferred type of method of assembly could be employed, and the quality of the joint could be closely monitored and also be subsequently tested. Further, the installation of the joint to the pipeline in the field would be much quicker if the joint merely had to be welded, or otherwise connected, to the two pieces of pipe that it is being connected to.

In any given pipeline, there is always the chance of the pipeline breaking due to the ground shifting, corrosion of the pipe, careless maintenance, fatigue, and so on. Ideally, the pipeline would not break, neither the pipe itself nor at a joint, but this is unfortunately very unrealistic.

Pipelines must conform to very rigorous standards and are made to a certain physical standard that is generally deemed very safe, depending on the size of the pipeline, the use of the pipeline, and so on. Any joint that is to used within the pipeline, therefore must be capable of withstanding the same pressures and forces, including bending moments, as the pipeline itself, otherwise the joints will be the weak link in the chain and will break. Unfortunately, manufacturers often do not build joint stronger than the pipe that the joint is connected to, and the joint ends up breaking.

Further, a factor that must be considered over and above the actual physical strength of the material that is used to form the joint, is the actual strength of the material used to seal the joint. A joint must be sealed in order to preclude pressurized gas within from escaping from the interior thereof. Virtually all joints have included therein a physical seal that is typically made of a plastic compound which forms a seal between the two abutting pieces of metal in the joint such that any pressurized gas contained within the pipe cannot escape through the seal. Typically, some sort of plastic seal is used because the plastic can provide a highly leak resistant seal between two interfacing metal pieces, and also the plastic can help provide a physically strong joint that is also slightly flexible, as required. In conjunction with the plastic material, an O-ring, probably of a synthetic rubber compound, is used to provide an extremely tight and highly reliable seal. The O-rings should be considered as the primary seal between the pieces of pipe and the plastic separating the pipe. Any other plastic components that are used to separate the pipes or are used in conjunction with covering and protecting any parts of the joint are considered to be secondary seals.

This sort of joint can be found in the prior art and is quite well known. It has been shown, through empirical evidence, that many of these types of joints that seem to satisfy the criteria of being a properly sealed joint, fail far more often than is acceptable.

Further, the joints must also provide adequate electrical insulation between two adjacent pipe length, even when the pipeline is installed in wet ground or is above ground and is exposed to moisture. Further, any connectors that are used to form or fasten the joint, or any materials that are used to weather proof the joint must also be physically protected so as to not experience physical degradation due to environmental exposure or endure damage unnecessarily while being installed, repaired, or for whatever reason.

Any type of joint that is used must be manufactured in more than one size since a variety of sizes of pipeline must be accommodated. Accommodating every size of pipeline can be accomplished by having a size of joint that is suitable for each size of pipeline, or by having joints that can be adapted, probably through some sort of physical adaptor, to fit more than one size of pipeline.

PRIOR ART:

A weld-in insulating joint marketed by Kerotest Manufacturing Corporation is a joint that is used to join two pipe ends together that comprises a thin cylindrical housing that accepts one pipe in each end thereof and is adapted to connect snugly to each pipe. Within the body of the insulator is a ring shaped primary seal made of adaprene urethane that keeps the two pipes physically apart and provides a seal to the exterior thereof to any gas or liquid flowing therethrough. There is also an exterior wrapping of fiberglass reinforced plastic that helps keep the joint from separating and also acts as an environmental seal. The ultimate strength of the joint in a bending mode is not predictable because the strength of the joint depends on a mix of materials of varying strength, varying modulus of elasticity and also variability of strength with changes in temperature.

An insulating joint manufactured by PSI Industries, provides a joint having two pipes joined together in mechanically sealed to each other. One of the two pipes has a hub and shroud arrangement that the other pipe fits into. The pipes are held in fixed relation one to the other by a pair of insulating rings and a pair of pressure seals, and by insulating filler.

A sealing gasket to be used in between two flanges, the flanges facing one another and each connected to the end of a pipe, is marketed by Central Plastics Company. The gasket is circular in shape with a hole in the center thereof for the passage of gas or liquid therethrough, and is concentric with the interior of the pipes. Located concentrically with the sealing gasket is a pair of O-rings, one on each face of the sealing gasket. The O-rings come in intimate contact with the faces of the sealing flanges and provide a tight seal when the sealing flanges are fastened thereto. The sealing flanges are fastened thereto by a series of bolts disposed around the flanges. There is no provision made to protect the portions of the bolts that are exterior to the flanges.

An insulating joint produced by Lall-Storm of France, provides a joint having two pipes joined together end-to-end, each pipe having a flange on one end, the flanges being for abutment one to the other. There is an insulating gasket similar to the one produced by Central Plastics Company, between the two flanges. Additionally, it discloses the use of a neoprene bushing between the two flanges and around each bolt and also discloses the use of a plastic type of material wrapped around the circumference thereof at the interface between the two flanges. There is also a coating around the outside of the joint made of a plastic such as neoprene, epoxy, polyester and so on. The covering is, however, applied in the field and is not part of the premanufactured product.

Another insulating joint is offered by prochind and provides a joint that is also used to convey gases or fluids. The joint has two metal pipe ends, one end terminating in a hub and shroud arrangement and one end terminating in a flange that fits within the shroud of the other pipe end. The pipe ends are held together by a cured resin material that fills the voids between the two pipe ends. A seal is formed between the two pipe ends by an insulating ring and an insulated sealing gasket.

The ultimate strength of the joint in a bending mode is not predictable because the strength of the joint depends on a mix of materials of varying strength, varying modulus of elasticity and also variability of strength with changes in temperature.

SUMMARY OF THE INVENTION

The present invention provides a mechanical joint for joining the ends of two pipes together, the pipes being part of a pipeline used for the transport of a gas or a liquid under pressure. Such pipelines are generay located outside, either under ground or above ground, and may also be located inside buildings. If a pipeline is located underground, the pipes therein are subject to moisture, physical shifting of the ground, ground electrical potential, and possible electrification from Hydro wires, among other things. If a pipeline is located above ground, the pipes therein may be subject to more severe environmental conditions. The joint allows for sealing of the two pipes together such that the interiors of the two pipes are in fluid communication one with the other and that the joint is sealed to the exterior, whereby any gas or fluid contained within the interior of the two pipes cannot pass to the exterior. The joint also provides means for electrically insulating the two adjoined pipes such that electricity, even very high voltage static electricity, cannot pass from one pipe to the other, even under adverse environmental weather conditions. Further, the joint is stronger than the pipes that it is connected to in terms of withstanding pressure, stress, and bending moments. This allows the joint to accommodate the low displacement but high stress movement that can occur between two adjoined pieces of pipe, without breaking. The ultimate strength of the joint is fairly predictable because it is held together by bolts of known strength.

The joint of the present invention provides these above characteristics while also being resistant to physical degradation, and thereby being able to provide these necessary characteristics over a long period of time.

The joint of the present invention has a hub that forms one end of a first pipe end and a flange that forms one end of a second pipe end. The flange portion of the first pipe end and the hub portion of the second pipe end are abutted one to the other, with an insulator gasket therebetween to provide mechanical sealing and electrical insulation between the first and second pipe ends. The insulator gasket has a pair of O-rings working in conjunction therewith to provide the primary seal for the joint along with the insulator gasket. This primary seal precludes any gas or liquid contained within the interior of the pipes from escaping to the exterior.

The pipes are physically held one to another by a plurality of threaded fasteners, which are typically large bolts that are threadably anchored into the hub. The fasteners are spaced generally evenly around the joint to provide an even distribution of forces. Resultingly, the fasteners are solidly anchored to the hub and are therefore in rigid physical connection thereto and in electrically conductive relation therewith. There is an insulating member displaced generally around each fastener, between the fastener and the flange, that provides an electrical insulation therebetween. There is also an amount of plastic material, preferably epoxy, that provides further electrical insulation between the fasteners and both the flange and the second pipe, that the flange is welded to. This epoxy also helps hold the first and second pipe ends together and has a shear strength roughly equal to the aggregate tensile strength of the bolts. There is also a shroud extending from the hub of the first pipe around the flange of the second pipe and also around the end portion of the second pipe. This shroud encases the plastic around the fasteners. Further, there is additional plastic material between the shroud and the flange and the second pipe to provide electrical insulation therebetween and to provide further physical protection for the fasteners. The insulating member around each fastener and the insulation between the shroud and the flange in the second pipe provide a secondary seal to preclude the escape of gas or fluid from the interior of the pipes. Further, the shroud provides additional mechanical strength for the joint.

The mechanical joint of the present invention may be assembled prior to installation in the pipeline in the field, or indeed may be assembled as it is installed in the pipeline. As discussed earlier, it is generally preferable to have the joint manufactured in a controlled environment such as a factory, where there is more control over the manufacturing process and where the joint maybe tested before it is used. If necessary, a joint can be removed from a pipeline and merely replaced with a new joint, and either discarded or returned to the factory for repair.

Many different sizes of pipes must be accommodated by the joint of the present invention. The design of the joint is suitable for a variety of different sizes of pipes. It is believed that a set number of different sizes of joints will be available and that adapters will be used to connect the joints to pipes, as appropriate. The advantages of having the joint manufactured in a factory are numerous including being abe to manufacture the joints using an automated process that employs the latest in technology, being able to monitor and control the manufacturing process, being able to inspect and test the assembled joints for purposes of quality control. The joints may also then be shipped as singe units, not as a number of pieces and containers of chemicals that are used to form the plastics. Further, the installation time in the field would be drastically reduced since only the welding of the joint to the existing pipes need be done. The installation could therefore be done by a welder and there would not have to be someone present during the installation who is knowledgeable about the assembly of the joint.

BRIEF DESCRIPTION OF THE DRAWINGS

FIG. 2 is an enlarged view of a portion of the cut away view of FIG. 1;

FIG. 3 is an enlarged view similar to FIG. 2, of an alternative embodiment of the invention.

DETAILED DESCRIPTION OF THE PREFERRED EMBODIMENTS

Figure 1:
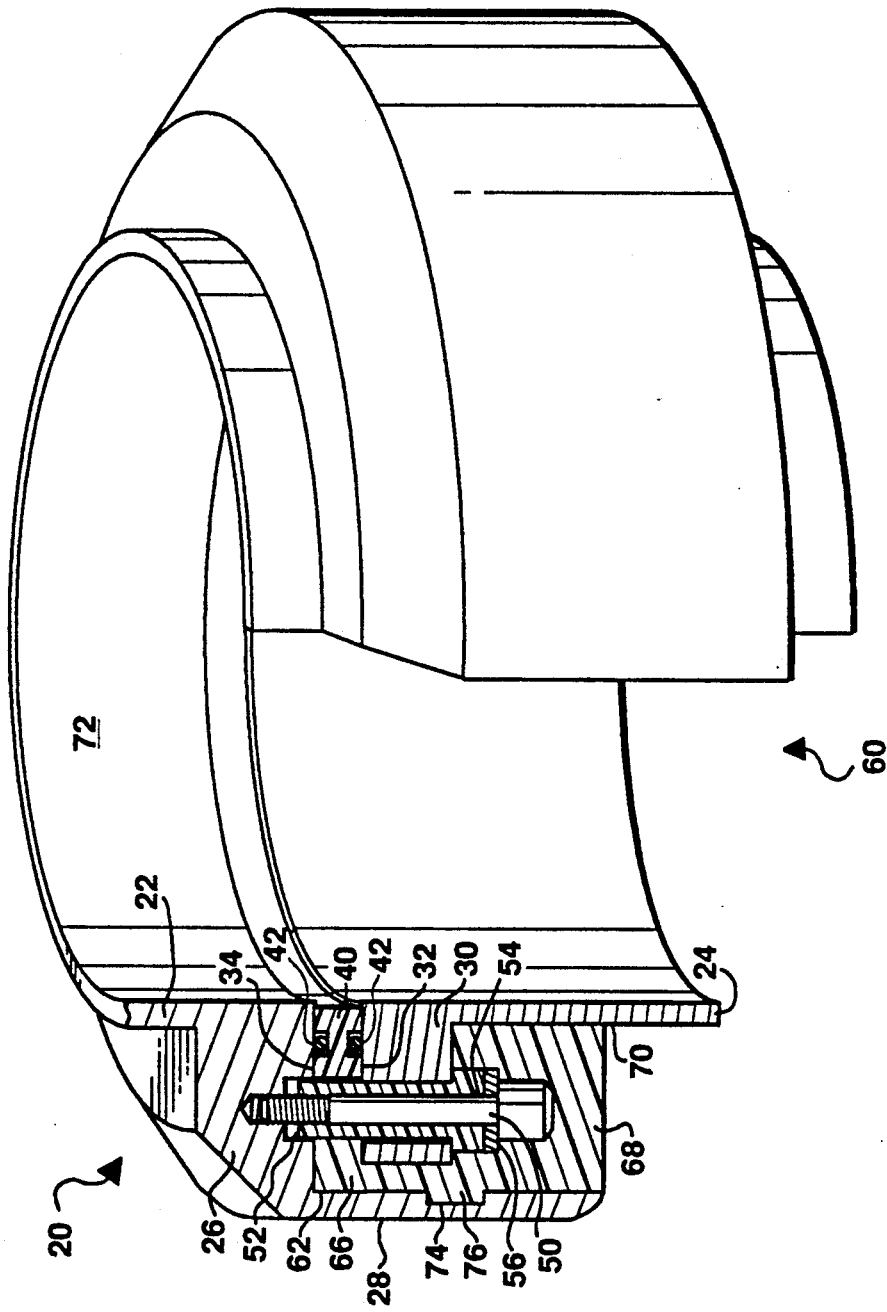
FIG. 1 is a partially cut away view of the electrically insulated joint of the present invention.

Reference will now be made to FIGS. 1 and 2 which show the electrically insulated joint 20 having a first pipe end 22 and a second pipe end 24. The first pipe end 22 and the second pipe end 24 are adapted for connection, typically by welding, to pipes in a pipeline. The first pipe end 22 leads into a hub 26, which in turn leads into an angularly shaped shroud 28. The second pipe end 24 terminates in a flange 30. In order to assemble the joint, the flange 30 of second pipe end 24 is positioned inside shroud 28 of first pipe end 22 such that the end surface 32 of flange 30 is facing the end surface 34 of hub 26. To keep end surface 32 physically separated from end surface 34, thereby precluding electrically conductive contact between the first pipe end 22 and second pipe end 24, an insulator gasket 40 is placed between the end surface 32 of flange 30 and the end surface 34 of hub 26. The insulator gasket 40 has a pair of O-rings associated therewith, one in each face of the gasket 40, with the O-rings 42 coming in intimate contact with the end surfaces 32 and 34 of the first pipe end 22 and second pipe end 24 respectively. The combination of the insulator gasket 40 and the O-rings 42 provide a primary seal between the end surface 34 of first end pipe 22 and the end surface 32 of second end pipe 24.

A plurality of threaded fasteners 50 are used to connect the first end pipe 22 to the second end pipe 24 and retain them in solid relation to each other. Typically, the fastener 50 is a bolt that extends through passage 52 in flange 30 and threadably engages with the hub 26. The fasteners 50 are generally evenly spaced around the flange 30 so as to provide an even distribution of forces around the perimeter of the electrically insulated joint 20.

Located around each fastener 50 is an insulating member 54. The insulating member 54 provides means for electrically insulating the fastener 50 from the flange 30. This is necessary since the fastener 50 is threadably engaged with hub 26 of first pipe end 22, and is therefore in electrically conductive relation with the first pipe end 22. Since it is necessary to electrically insulate the first pipe end 22 from the second pipe end 24, the fastener 50 must be insulated from the flange 30. Preferably, there is a washer 56 between the head of the fastener 50 and the insulating member 54. The washer 56 distributes the torquing pressure under the bold head across the surface of the flange in order to prevent fracture.

Between the inside perimeter 62 of the shroud 28 and the outside perimeter 64 of the flange 30 there is a space 66. This space 66 is generally annular in shape. Further, there is a void 68 between the inside perimeter 62 of the shroud 28 and the outside perimeter 70 of the second end pipe 24. The space 66 and the void 68 are created so as to ensure physical separation of the second pipe end 24 and flange 30 from the shroud 28, which is of course part of the first pipe end 22, thus ensuring that the first pipe end 22 and the second pipe end 24 are not in electrically conductive relation. Preferably, the space 66 and the void 68 are filled with a first volume plastic resin material in order to provide environmental sealing of the insulating components. The plastic resin is preferably somewhat resilient. The plastic resin a so provides supplementary electrical insulation between the shroud 28 and the flange 30 and second end pipe 24, and also to provide a protective covering over the fasteners 50. The shroud 28 serves to protect the plastic material in the space 66 and in the void 68, thereby ultimately protecting the fasteners 50 and the O-ring 42.

In the preferred embodiment, the interior 60 of the electrically insulated joint 20 has a liner 72 attached thereto. The liner 72 is preferably made of epoxy and provides a further seal to preclude the passage of gas or liquid from the interior 60 of the electrically insulated joint 20 to the exterior thereof.

In the preferred embodiment, there is a groove 74 in the inside perimeter 62 of the shroud 28. This groove serves to provide the volume for the insulating plastic resin to form into and form a projection 76 therein. The projection 76 then acts as a key, and precludes the plastic resin in void 68 and space 66 from being unwantedly removed therefrom.

The shear strength of the projection 76 is greater than the aggregate tensile strength of the threaded fasteners 50. This precludes the projection 76 from breaking off the rigid plug 88, which, therefore tends to keep the rigid plug 88 in place if the threaded fasteners 50 should fail.

Reference will now be made to FIG. 3, which shows an alternative embodiment of the invention. The electrically insulated joint 80 is very similar to the embodiment disclosed in FIGS. 1 and 2, except that there is more than one volume of plastic resin used to fill space 82 and void 84. There is a first volume of plastic resin 83 and a second volume of plastic resin 85, separated by a ring 86. After the electrically insulated joint 80 has been assembled in the same manner as disclosed earlier, the ring 86 is placed within the void, around the second pipe end 87. A rigid plug 88 composed of plastic resin, which is the second volume of plastic resin, is placed therein. In this alternative embodiment, there is a groove 90 in the interior perimeter 92 of shroud 94, and adjacent the void 68. A corresponding key or projection 96 on the rigid plug 88 fits intimately into the groove 90 and precludes the rigid plug 88 from being unwantedly removed therefrom. The rigid plug 88 is typically made of a hard epoxy material.

Further, the space 82 is filled with a sealant which is typically a teflon-silicon combination and forms the first volume of plastic resin 83. The sealant is injected into the space 82 through openings 100 which are spaced around the periphery of the shroud 94. The sealant is a material that is relatively soft enough such that it can be easily injected into all of the crevices within the space 82. Once the sealant has been fully injected therein, a plug 102 is inserted into opening 100.

Figure 4:
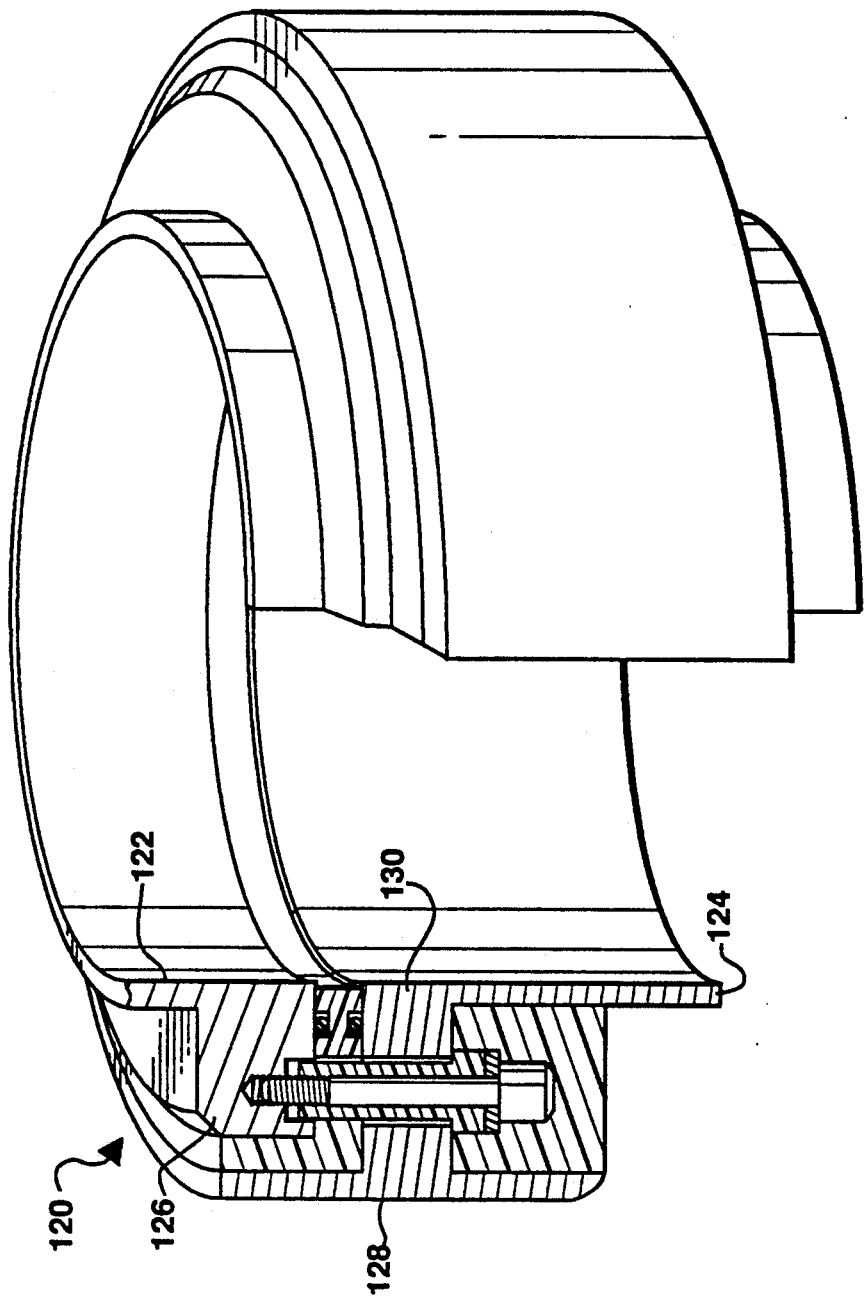
FIG. 4 is a partially cut away view of an alternative embodiment of the insulating joint of the present invention.

In a further alternative embodiment, as shown in FIG. 4, the electrically insulated joint 120 has a first pipe end 122 and a second pipe end 124, similar to that shown in FIG. 1. The first pipe end 24 has a hub 126 and the second pipe end 124 has a flange 130, with both the hub 126 and the flange 130 being similar to those shown in FIG. 1. There is also a shroud 128 that extends from the flange 130 in two directions -- the first direction being toward hub 126 and the second direction being back toward second pipe end 124. The shroud 128 serves the same purpose as the shroud 28 shown in FIG. 1.

Other modifications and alterations may be used in the design and manufacture of the electrically insulated pipeline joint of the present invention without departing from the spirit and scope of the present invention.

I claim:

1. An insulating mechanical joint for placement in a pipeline, whereby two contiguous pieces of pipe are in mechanical and fluid connection with each other, but electrically insulated from each other, and where the pipeline is operated under fluid pressure, said joint comprising:

a first pipe end and a second pipe end, each having a size compatible with the pipeline and being adapted for connection therewith;

a hub connected with said first pipe, said hub provided with a face having threaded sockets therein;

a flange connected with said second pipe end, said flange provided with a face having passages therethrough, said faces opposing each other;

an insulator gasket placed between said opposing faces of said hub and said flange, said insulator gasket having a first face and a second face; and a plurality of threaded fasteners extending through said passages therefore in said flange, and engaged with said threaded sockets in said hub, said threaded fasteners being a threaded screw means including a head;

wherein said hub has a shroud associated therewith, said shroud being dimensioned so as to extend axially away from the opposing face of said hub past said flange and spaced outwardly therefrom, whereby a space is formed between the outer perimeter of said flange and at least a portion of the inside perimeter of said shroud;

said shroud projecting past said flange, whereby a void is formed between an inside perimeter of said shroud and an outside perimeter of said second pipe end;

wherein at least one O-ring is used in conjunction with said insulator gasket, said O-ring being in intimate contact with one face of said insulator gasket and also in intimated contact with one of said opposed faces of said hub and said flange;

wherein an insulating member is placed in each if said passages in said flange and beneath the heads of said threaded fasteners so as to electrically insulated said threaded screw means from said flange; and wherein said space and at least a portion of said void are filled with a first volume of plastic resin.

2. The insulating mechanical joint of claim 1, wherein a groove is formed in the inside perimeter of said shroud so as to be adjacent to at least a portion of said space, and wherein said groove is filled by a protection from said first volume of plastic resin.

3. The insulating mechanical joint of claim 1, wherein said space between said outside perimeter of said flange and said at least a portion of the inside perimeter of said shroud, is annular in shape.

4. The insulating mechanical joint of claim 1, wherein two O-rings are used in conjunction with said insulator gasket, one O-ring in conjunction with said first face of said insulator gasket and the other O-ring in conjunction with said second face of said insulator gasket.

5. The insulating mechanical joint of claim 1, wherein said insulator gasket includes a groove on each of said first and second faces receiving said O-rings.

6. The insulating mechanical joint of claim 1, wherein said first volume of plastic resin fills a portion of said void only;

said void having a ring therein, said ring disposed circumferentially engaging said second pipe end and said inside perimeter of said shroud and generally in contact with said heads of said threaded fasteners;

where a remainder of said void is filed with a second volume of plastic resin that is separate from said first volume of plastic resin;

wherein said ring provides a barrier between the two filings of said plastic resin; and wherein a groove is formed in the inside perimeter of said shroud so as to be adjacent to said void and wherein said groove is filled by a projection from said second volume of plastic resin.

7. An insulating mechanical joint for placement in a pipeline, whereby two contiguous pieces of pipe are in mechanical and fluid connection with each other, but electrically insulated from each other, and where the pipeline is operated under fluid pressure, said joint comprising:

a first pipe end and a second pipe end, each having a size compatible with the pipeline and being adapted for connection therewith;

a hub connected with said first pipe, said hub provided with a face having threaded sockets therein;

a flange connected with said second pipe end, said flange provided with a face having passages therethrough, said faces opposing each other;

an insulator gasket placed between said opposing faces of said hub and said flange, said insulator gasket having a first face and a second face; and a plurality of threaded fasteners extending through said passages therefore in said flange, and engaged with said threaded sockets in said hub, said threaded fasteners being a threaded screw means including a head;

wherein said flange has a shroud associated therewith, said shroud being dimensioned so as to extend axially away from the opposing face of said hub past said hub and spaced outwardly therefrom, whereby a space is formed between the outer perimeter of said hub and at least a portion of the inside perimeter of said shroud;

said shroud projecting past said hub, whereby a void is formed between an inside perimeter of said shroud and an outside perimeter of said second pipe end;

wherein at least one O-ring is used in conjunction with said insulator gasket, said O-ring being in intimate contact with one face of said insulator gasket and also in intimated contact with one of said opposed faces of said hub and said flange;

wherein an insulating member is placed in each if said passages in said flange and beneath the heads of said threaded fasteners so as to electrically insulated said threaded screw means from said flange; and wherein said space and at least a portion of said void are filled with a first volume of plastic resin.

* * * * *